(12) United States Patent
Williams

(10) Patent No.: US 8,801,363 B2
(45) Date of Patent: Aug. 12, 2014

(54) WIND TURBINE WITH PULLEY TRANSFER BOX APPARATUS

(76) Inventor: Herbert Williams, Paletka, FL (US)

( * ) Notice: Subject to any disclaimer, the term of this patent is extended or adjusted under 35 U.S.C. 154(b) by 943 days.

(21) Appl. No.: 12/927,349

(22) Filed: Nov. 12, 2010

(65) Prior Publication Data

US 2012/0121418 A1    May 17, 2012

(51) Int. Cl.
| | | |
|---|---|---|
| F03D 7/02 | (2006.01) | |
| F03D 11/02 | (2006.01) | |
| F03D 5/02 | (2006.01) | |
| F16H 7/14 | (2006.01) | |

(52) U.S. Cl.
CPC .............. *F03D 11/02* (2013.01); *F03D 7/0276* (2013.01); *F03D 7/0248* (2013.01); *F05B 2260/4021* (2013.01); *Y02E 10/722* (2013.01); *F03D 5/02* (2013.01); *F16H 7/14* (2013.01); *Y10S 415/908* (2013.01)
USPC ................ 415/4.3; 415/5; 415/908; 416/195; 416/196 A

(58) Field of Classification Search
CPC ....... F03D 5/02; F03D 7/0248; F03D 7/0264; F03D 7/0276; F16H 7/10; F16H 7/14; F16H 7/16; F16H 7/22; F16H 55/56; B66D 3/04; B66D 3/06; B66D 3/10
USPC .............. 415/4.1, 4.3, 5, 908, 60; 416/7, 194, 416/195, 196 A
See application file for complete search history.

(56) References Cited

U.S. PATENT DOCUMENTS

| | | | | |
|---|---|---|---|---|
| 1,334,485 | A | * | 3/1920 | Clipfell et al. ................... 290/55 |
| 3,762,229 | A | * | 10/1973 | Johnson .......................... 474/77 |
| 4,319,865 | A | | 3/1982 | Richard |
| 4,330,714 | A | | 5/1982 | Smith |
| 4,350,895 | A | | 9/1982 | Cook |
| 4,450,362 | A | | 5/1984 | Gallagher |
| 4,545,729 | A | | 10/1985 | Storm |
| 4,729,716 | A | | 3/1988 | Schmidt |
| 4,986,534 | A | | 1/1991 | Meier et al. |
| 6,020,875 | A | * | 2/2000 | Moore et al. ................... 345/156 |
| 6,664,655 | B2 | | 12/2003 | Vann |
| 7,399,162 | B2 | | 7/2008 | Williams |

* cited by examiner

*Primary Examiner* — Edward Look
*Assistant Examiner* — Adam W Brown
(74) *Attorney, Agent, or Firm* — Thomas C. Saitta

(57) ABSTRACT

A wind turbine for generating electrical power, the turbine having a rotor assembly comprising a hub, an annular rim and a plurality of blade members extending between the hub and rim, a pulley transfer box apparatus and a looped member extending circumferentially about the annular rim and through the pulley box transfer apparatus, the pulley box transfer apparatus having a pair of drum pulleys each having a plurality of annular grooves receiving the looped member.

12 Claims, 2 Drawing Sheets

WIND TURBINE WITH PULLEY TRANSFER BOX APPARATUS

BACKGROUND OF THE INVENTION

The invention relates generally to the field of fluid driven turbines, such as wind turbines, wherein electrical power is generated from airflow across rotor blades. More particularly, the invention relates to such turbines wherein the blades extend from a central rotating hub or shaft member to an outer annular rotating ring or rim member. Even more particularly, the invention relates to such turbines wherein rotational energy is transferred by a cable, rope, belt or the like positioned on the outer rim of the turbine.

Wind turbines, also known as windmills, wind generators, wind machines or the like, are well known devices for producing energy, typically electrical energy, by harnessing the power of wind. Typical wind turbines are very large structures, standing hundreds of feet tall and having rotor blades extending hundreds of feet, the rotor blades being mounted to a central hub or shaft. Large elongated blades are required since the area of blade sweep is proportional to the power that can be produced by a given wind turbine. This size creates a problem, in that each blade must act as a cantilever that can support the elongated blade and the blades must be increasingly massive toward the central hub in order to preclude the blade from breaking during use. Even with the use of high tech composites, carbon fibers and the like, a practical limit has been reached. For example, most large wind turbines have three blades, as this has been found to be the most efficient design. The desire to increase blade length in order to capture more wind is offset by the accompanying reduction in shaft revolutions per minute (rpm). Reduced rpm's require larger reduction gearboxes, which is undesirable. Decreasing blade pitch in order to increase the rpm's reduces torque, which is undesirable. In addition, repair or replacement of these giant blades is difficult and can be extremely expensive. The cost of upkeep and repair reduces the overall benefits of energy production using wind technology. Thus, known wind turbine designs always have to make sacrifices in order to balance these competing factors.

An alternative type of wind turbine incorporates an outer, annular ring or rim that is joined to the blades, such that the blade tips are no longer self-supporting and thereby allowing the blades to be lighter and/or longer, easier to manufacture and repair, etc. The blades extend from the central rotating hub or shaft to the annular rim and are therefore supported at both ends. In this embodiment, it is also known to capture the rotational energy from the rotating annular rim rather than capturing the rotational energy directly from the central hub, since a point on the annular rim travels at a much faster rate than a point on the central hub. Rollers, wheels, gears, magnets or the like are used to transfer the rotational energy from the rim to one or more generator mechanisms or the like. Examples of such turbines are shown in U.S. Pat. No. 4,319,865 to Richard, U.S. Pat. No. 4,330,714 to Smith, U.S. Pat. No. 4,350,895 to Cook, U.S. Pat. No. 4,545,729 to Storm, U.S. Pat. No. 4,729,716 to Schmidt, U.S. Pat. No. 6,664,655 to Vann, and U.S. Pat. No. 7,399,162 to Williams. Such wind turbines are often of smaller size and utilize sail-like blades rather than complicated blade structures in order to increase the number of wind catching elements, since the weight of the annular rim adds structural problems to the design. The smaller structure allows for construction, installation and maintenance costs of the wind turbine to be much lower than typical wind turbines.

It is an object of this invention to provide an improved methodology and structure for capturing the rotational energy of the outer annular rim through the use of a looped cable, rope, belt or similar member that is positioned on the outer annular rim, the looped member extending away from the annular rim and through a pulley transfer box system for operation of an output shaft connected to a generator or like system, whereby a single revolution of the annular rim results in multiple revolutions of the output shaft. It is a further object of this invention to provide an improved structure for the pulley transfer box apparatus, such that tautness of the looped member can be readily adjusted to maintain proper tension and such that the friction grip of the system can be maximized to result in higher torque.

SUMMARY OF THE INVENTION

The invention is a wind turbine for generating electrical power, the wind turbine comprising a rotating rotor assembly comprising a rotating central hub member and a rotating outer annular rim member, the rim member joined to the hub by a plurality of blade members. The wind turbine further comprises a looped member, such as a cable, rope, belt or similar member, which is positioned about the annular rim member such that the annular rim member functions as a drive pulley when the annular rim member is rotated by the wind. The looped member also passes through a pulley transfer box apparatus having one or more drive shafts that operate one or more generators or similar apparatuses, the pulleys in the pulley transfer box apparatus being of much smaller diameter, whereby a single revolution of the annular rim member results in multiple revolutions of the one or more rotating drive shafts.

The pulley transfer box apparatus comprises a pair of opposing pulley drums, each pulley drum mounted onto its own axle or shaft, the axles being parallel, and each pulley drum comprising a plurality of independent circumferential grooves to receive the looped member. Each pulley drum may be formed as a unitary member or may be formed by affixing multiple pulleys onto the single axle or shaft. Preferably, one of the pulley drums is shifted in the axial direction such that the grooves of one pulley drum are not aligned with the corresponding grooves on the other pulley drum. The looped member extends from the annular rim member onto one of the outermost grooves of the first pulley drum, then extends across to the outermost groove of the second pulley drum, and then passes back and forth from one drum to the other until ultimately extending from the outermost groove of the second pulley drum and back onto the annular rim member. Due to the back and forth wrapping of the looped member on the pulley drums, at least one set of the bridging portions of the looped member extending between the pulley drums will be non-perpendicular to the axial direction of the axles, thereby increasing the grip of the grooves. Misaligning the two pulley drums results in even greater gripping strength because of increased friction effects.

Preferably the pulley drums may be adjusted as to their distance of separation and the amount of non-alignment shift, thereby allowing the tension of the looped member to be easily controlled.

DETAILED DESCRIPTION OF THE INVENTION

With reference to the drawings, the invention will now be described in detail with regard for the best mode and the preferred embodiment. In a broad sense, the invention is a fluid powered turbine, such as a wind turbine, where airflow rotates a rotor assembly on a central shaft or hub member, whereby electrical power or the like is generated by the rotational energy, and wherein the rotor element comprises a plurality of blade members extending from the rotating central hub member to a rotating annular rim member, and whereby the rotational energy of the annular rim is transferred to generators or similar apparatuses by a looped member positioned on or about the annular rim member and passing through a pulley transfer box apparatus.

Figure 1:
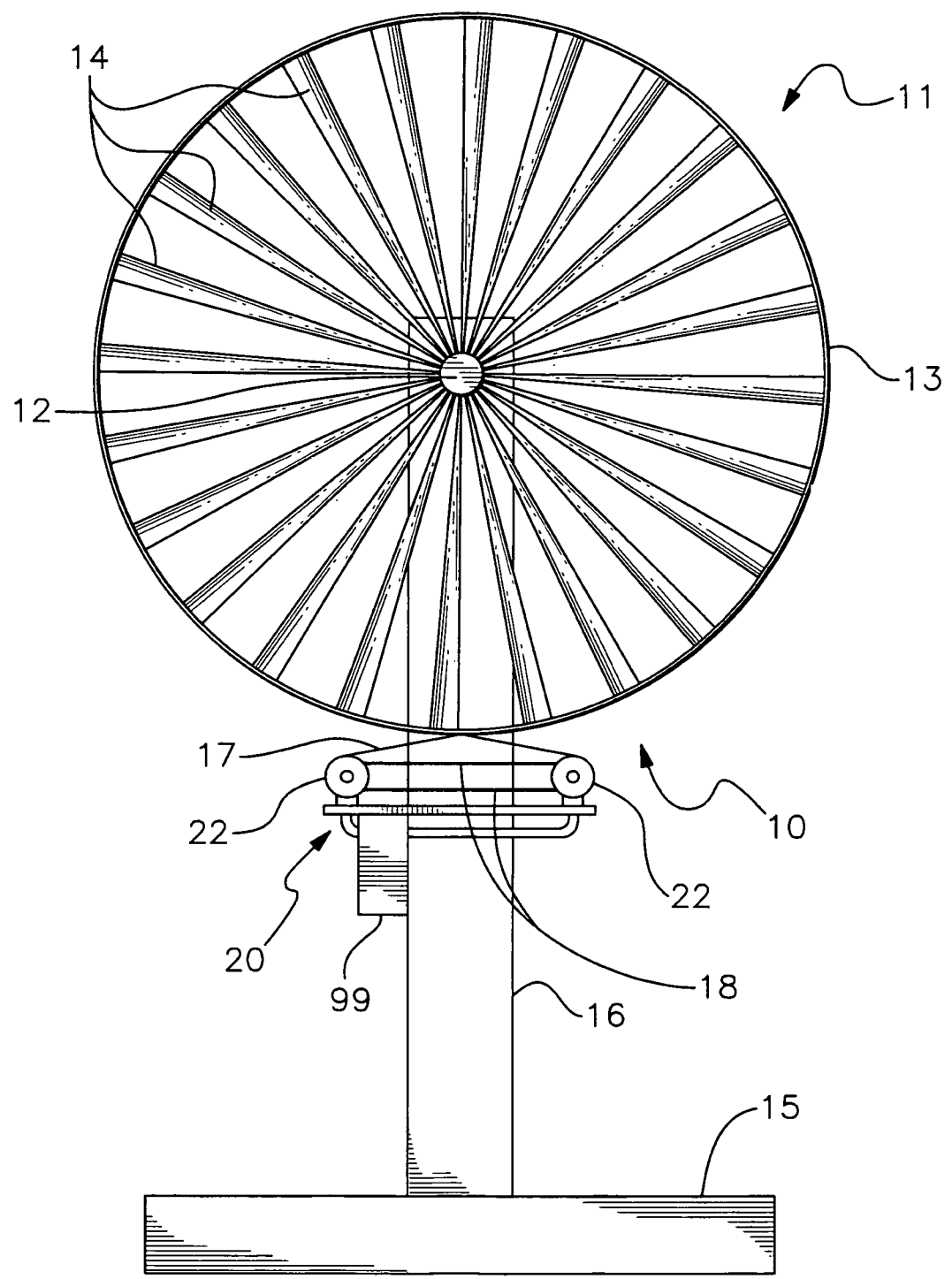
FIG. 1 is a simplified illustration of a wind turbine consisting of a rotating hub, a rotating annular outer rim and a plurality of blades extending from the hub to the rim, with a looped member extending from the annular outer rim through a pulley transfer box apparatus.

As shown in FIG. 1, a typical turbine 10 comprises a rotor assembly 11 mounted onto a fixed support means, such as a base 15 and tower 16, whereby the rotor assembly 11 is positioned to have a generally horizontal axis of rotation in order to capture wind passing across the ground surface. The turbine may be of any size, and the structure as described herein is suitable for relatively large turbines, wherein the diameter of the rotor assembly 11 may be hundreds of feet.

The rotor assembly 11 comprises a central rotating hub or shaft member 12, which is mounted in suitable manner to a tower 16 such that the rotor assembly 11 can rotate relative to the fixed support means. The rotor assembly 11 further comprises an outer or peripheral annular ring or rim member 13; with a plurality of blade members 14 extending between the rim member 13 and the central hub member 12, the blade members 14 being the means to capture the energy of the wind and translate that energy into rotational movement.

The wind turbine further comprises a looped member 17, such as a cable, rope, chain, belt, sling or similar member, which is positioned circumferentially about the annular rim member 13 of the rotor assembly 11 such that the annular rim member 13 functions as a drive pulley when the annular rim member 13 is rotated by the wind. The outer surface of the annular rim member 13 is provided with a groove or channel to receive and retain the looped member 17 in a non-sliding manner. The looped member 17 also passes through a pulley transfer box apparatus 20 having one or more drive shafts or axles 21 that operate one or more generators, air compressors or similar apparatuses 99, such apparatuses being referred to herein collectively as generator apparatuses 99. The pulleys in the pulley transfer box apparatus 20 are sized to be of much smaller diameter than the annular rim member 13, whereby a single revolution of the annular rim member 13 results in multiple revolutions of the one or more rotating drive axles 21. The drive axles 21 may be directly coupled to the generator apparatuses 99, as shown in FIG. 2, or the rotation energy of the drive axles 21 may be transferred indirectly, such as hydraulically, to generator apparatuses 99, as shown in FIG. 1.

Figure 2:
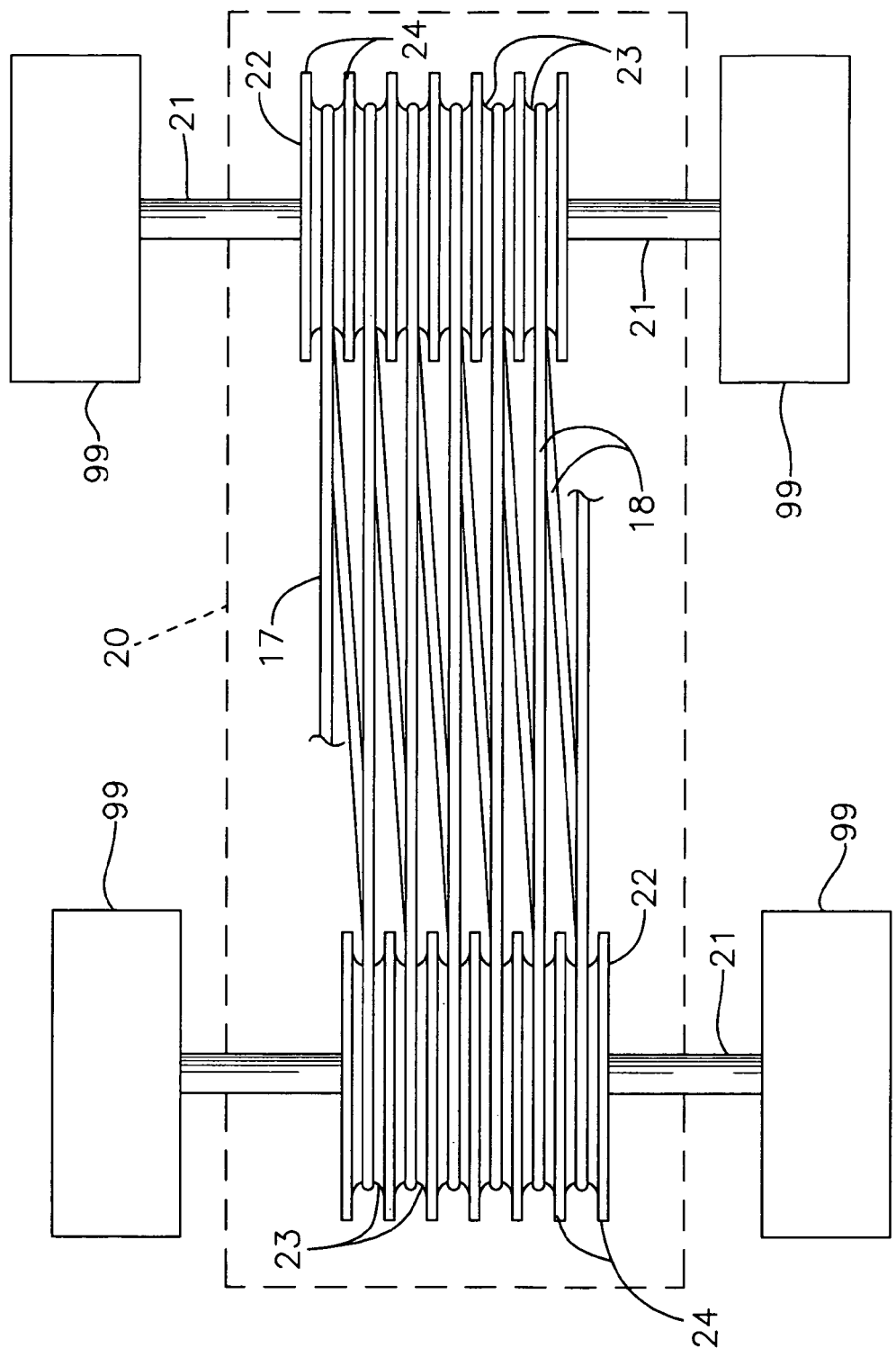
FIG. 2 is partial view showing the bridging portions of the looped member passing between the pulley drums of the pulley transfer box apparatus.

As shown in FIG. 2, the pulley transfer box apparatus 20 comprises a pair of opposing pulley drums 22, each pulley drum 22 mounted onto its own axle or shaft 21, the axles 21 being parallel to each other. Each pulley drum 22 comprises a plurality of separate, annular, circumferential grooves 23 to receive and retain the looped member 17 in a non-sliding manner. Each pulley drum 22 may be formed as a unitary member or may be formed by affixing multiple individual pulleys onto a single axle or shaft 21. Preferably, one of the pulley drums 22 is shifted in the axial direction relative to the other pulley drum 22 such that the grooves 23 of one pulley drum 22 are not directly aligned with the corresponding grooves 23 on the other pulley drum 22. The looped member 17 extends from the annular rim member 13 onto one of the outermost grooves 23 of the first pulley drum 22, then extends across to the outermost groove 23 of the second pulley drum 22, and then passes back and forth from one pulley drum 22 to the other pulley drum 22, thereby defining a plurality of bridging portions 18, until ultimately extending from the outermost groove 23 of the second pulley drum 22 and back onto the annular rim member 13. Due to the back and forth wrapping of the looped member 17 on the pulley drums 22, at least one set of the bridging portions 18 of the looped member 17 extending between the pulley drums 22 will be non-perpendicular to the axial direction of the axles 21, thereby increasing the grip of the grooves 23 due to friction effects between the looped member 17 and the sides of the flanges 24. Misaligning the two pulley drums 22 results in even greater gripping strength because of increased friction effects between the flanges 24 defined by the grooves 23 and the looped member 17.

Preferably means for adjusting the separation distance between the pulley drums 22 are provided such that the pulley drums 22 are adjustable as to their distance of separation in the direction perpendicular to the pulley drum axial direction. Furthermore, it is also preferred that means for adjusting the relative alignment of the pulley drums 22 in the axial direction are also provided, thereby allowing the tension of the looped member 17 and the gripping force of the pulley drums 22 to be easily increased or decreased as desired. One or both of said pulley drums may be adjustable to accomplish this. Such means are incorporated into the pulley transfer box apparatus 20, and suitable mechanisms for accomplishing these functions are well known in the art. In addition, increasing the number of grooves 23 in each pulley drum 22 will also increase the gripping force of the pulley drums 22. Air brakes or reduction gear mechanisms, not shown but well known in the art, may be utilized to control the rotational speed of the pulley drum axles 21.

It is understood that equivalents and substitutions for certain elements set forth above may be obvious to those skilled in the art, and therefore the true scope and definition of the invention is to be as set forth in the following claims. The embodiments shown in the drawings are presented for illustration and disclosure purposes, and the drawings are not intended to limit the invention.

I claim:

1. A wind turbine comprising:
a rotor assembly comprising a rotating central hub member, a rotating annular rim member, and a plurality of blade members extending between said annular rim member and said hub member;
a pulley transfer box apparatus comprising a pair of opposing pulley drums, each said pulley drum mounted onto its own axle, said axles being positioned parallel to each other, each said pulley drum comprising a plurality of separate circumferential grooves;
a looped member positioned circumferentially about said annular rim member and within said grooves of said pulley drums, whereby bridging portions of said looped member extend back and forth between said grooves of said pulley drums; and
at least one generator apparatus, whereby rotation of said rotor assembly by the wind is transferred through said looped member through said pulley drum axles to said at least one generator apparatus.

2. The wind turbine of claim 1, wherein the distance between said pulley drum axles is adjustable.

3. The wind turbine of claim 1, wherein one of said pulley drums is shifted in the axial direction such that said grooves of said one of said pulley drums are not aligned with said grooves of the other of said pulley drums.

4. The wind turbine of claim 1, wherein at least one of said pulley drums is adjustable relative to the other of said pulley drums in the axial direction.

5. The wind turbine of claim 1, wherein at least one of said pulley drum axles is directly connected to said at least one generator apparatus.

6. The wind turbine of claim 1, wherein said at least one of said pulley drum axles is indirectly connected to said at least one generator apparatus.

7. A wind turbine comprising:
- a rotor assembly comprising a rotating central hub member, a rotating annular rim member, and a plurality of blade members extending between said annular rim member and said hub member;
- a pulley transfer box apparatus comprising a pair of opposing pulley drums, each said pulley drum mounted onto its own axle, said axles being positioned parallel to each other, each said pulley drum comprising a plurality of annular grooves; and
- a looped member positioned circumferentially about said annular rim member and within said grooves of said pulley drums, whereby bridging portions of said looped member extend back and forth between said grooves of said pulley drums;
- whereby rotation of said rotor assembly is transferred by said looped member to said pulley drums to rotate said pulley drum axles.

8. The wind turbine of claim 7, wherein the distance between said pulley drum axles is adjustable.

9. The wind turbine of claim 7, wherein one of said pulley drums is shifted in the axial direction such that said grooves of said one of said pulley drums are not aligned with said grooves of the other of said pulley drums.

10. The wind turbine of claim 7, wherein at least one of said pulley drums is adjustable relative to the other of said pulley drums in the axial direction.

11. The wind turbine of claim 7, further comprising at least one generator apparatus, and wherein at least one of said pulley drum axles is directly connected to said at least one generator apparatus.

12. The wind turbine of claim 7, further comprising at least one generator apparatus, and wherein said at least one of said pulley drum axles is indirectly connected to said at least one generator apparatus.

* * * * *